Jan. 22, 1963 W. VENZIANI 3,074,570
LIFTING APPARATUS FOR THE LOADING OF MATERIAL USABLE
WITH MOTOR-VEHICLES
Filed Oct. 23, 1959 2 Sheets-Sheet 1

INVENTOR: WALTER VENZIANI

INVENTOR:
WALTER VENZIANI

3,074,570
LIFTING APPARATUS FOR THE LOADING OF MATERIAL USABLE WITH MOTOR-VEHICLES
Walter Venziani, Magliaso, Switzerland
Filed Oct. 23, 1959, Ser. No. 848,284
Claims priority, application Switzerland Apr. 8, 1959
1 Claim. (Cl. 214—75)

The subject of the present invention is a lifting apparatus for the loading of various kinds of material and usable with motor-vehicles, particularly those having load-boxes, the apparatus consisting of a trolley formed by two planes at right angles to each other, one of the planes functioning as a scoop while the other is equipped with two pairs of wheels guided and running between two rails which pass vertically over the front of the vehicle and then over the driver's cabin to the rear until they reach the load-box, where the material contained in the trolley is deposited, the said trolley being lifted and pulled by a steel cable, which runs on guide-pulleys, by means of a motor-operated winch of which the controls are situated in the driver's cabin, while suitable means, already known, are provided for securing the trolley in any position in the course of its journey.

The ends of the rails are slightly curved, so that the loading plane of the trolley can lower itself to the ground in the front of the vehicle, thus facilitating the loading-operation, and so that the plane fitted with wheels can be inclined backwards in order to accelerate the discharge of the material into the load-box when this latter is raised as far as the trolley by the motor-vehicle's own operating-devices.

The rails consist of C-irons and are appropriately affixed to the framework of the motor-vehicle, although in an alternative form of construction they are formed, in order not to reduce visibility from the point of view of the driver, of thin blades of metal between which the wheels of the trolley are guided and run.

In another alternative form of construction the loading-plane of the trolley lowers itself, with respect to the plane with the wheels, as far as the ground, and in this case the plane bearing the wheels is subdivided into two parallel planes, one of which slides in the other over a slight distance, this sliding-movement only being effected when the trolley, having reached the end of its journey, is abandoned, the cable being slackened.

In relation to the nature of the material to be loaded, two rims are provided on the trolley, and the end of the plane which takes up the actual material is also provided with a toothed attachment enabling it to operate as a grab.

The plane operating as a scoop is hinged to that bearing the wheels so that the trolley can be closed up when the lifting apparatus is not in use, thus reducing the space occupied by it, and the said trolley is attached to the rails above the cabin by known means.

The lifting-apparatus to which the present invention relates can with advantage be applied to the supporting-structure of any type of motor-vehicle, including agricultural vehicles, and can also be used for loading material onto other vehicles, moving material from one place to another and, finally, as a snow-plough during the winter months.

Further features and advantages of the invention will emerge in the course of the following description, which, in conjunction with the attached drawing, given merely by way of an example, will clearly show how the present invention can be operated, the features emerging both from the text and from the drawing naturally forming an integral part of the said invention.

Figure 2:
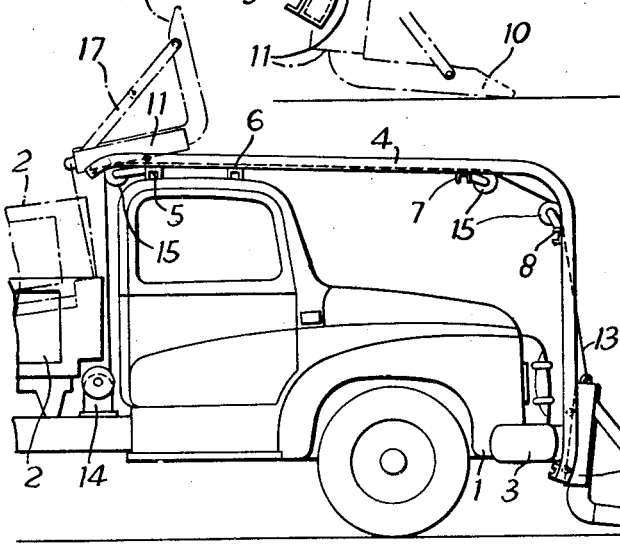
FIG. 2 is a partial lateral view of the motor-vehicle with the lifting-apparatus shown in FIG. 1 and showing the trolley in the loading-position by means of continuous lines and in the discharge-position by means of lines and dots.

With reference to the attached drawing, 1 indicates the motor-vehicle equipped with load-box 2, the vehicle in the present case being a lorry, two rails 4 and 4' being welded to the shock-absorber 3 in the front and consisting of C-sections with the flanges in evidence and running from the front of the motor-vehicle and over the driver's cabin, where they are slightly inclined in respect of the horizontal, to the load-box 2, and affixed to the roof of the cabin by means of the cross-members 5, 6. Further cross-members 7, 8 and 9 are placed at various positions along the path covered by the rails and serve to keep the latter in place with respect to the vehicle. The trolley consists of two planes at right angles to each other, that marked 10 operating as a scoop while the other, marked 11, has two pairs of wheels 12, guided and running between the rails 4, 4'. This trolley is lifted and pulled by a steel cable 13, by means of a winch 14 (FIG. 2), which can be operated from an independent motor or by operating-devices incorporated in the motor-vehicle itself. The said metal cable 13 runs on pulleys 15 placed in suitable positions, between the rails 4, 4', along the path covered by the latter.

The ends of the rails 4, 4', both that facing the ground and that facing the load-box, are slightly curved, in order to enable the loading-plane 10 of the trolley to lower itself in the front, as far as the ground, thus facilitating the loading-operation, and in order to enable the plane equipped with wheels to incline in the rear, thus accelerating the operation of discharging the material into the load-box when this latter is raised by the motor-vehicle's own operating-devices to a position in the proximity of the trolley itself.

Figure 1:
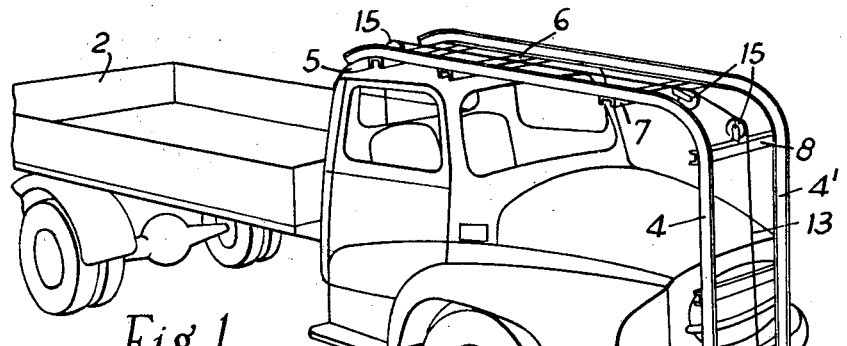
FIG. 1 is a view, in perspective, of a motor-vehicle with the lifting-apparatus attached to it and with the trolley on the ground, in the loading-position.
Figure 3:
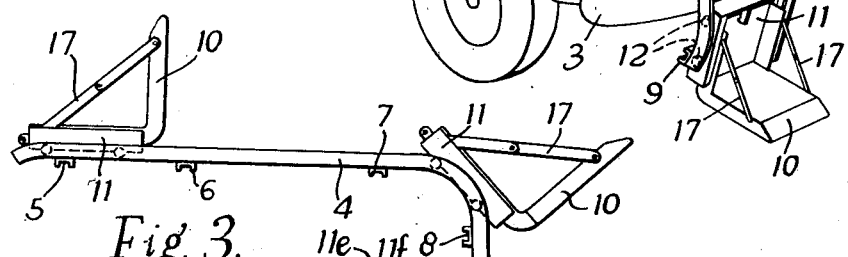
FIG. 3 is a part drawing showing the trolley in two different positions in the course of the path covered by the rails.
Figure 4:
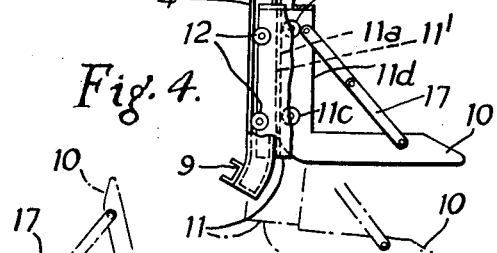
FIGS. 4 and 5 illustrate two alternative designs.
Figure 5:
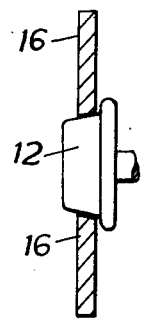

In an alternative form of construction, the loading plane 10 of the trolley lowers itself, with respect to the plane fitted with the wheels, until it reaches the ground, and in this case the plane equipped with the wheels is subdivided into two parallel planes 11', 11", one sliding inside the other over a small distance as indicated in FIG. 4, this sliding-movement only being effected when the trolley, after reaching the end of its descending journey, is abandoned, the cable 13 being slackened.

Figure 6:
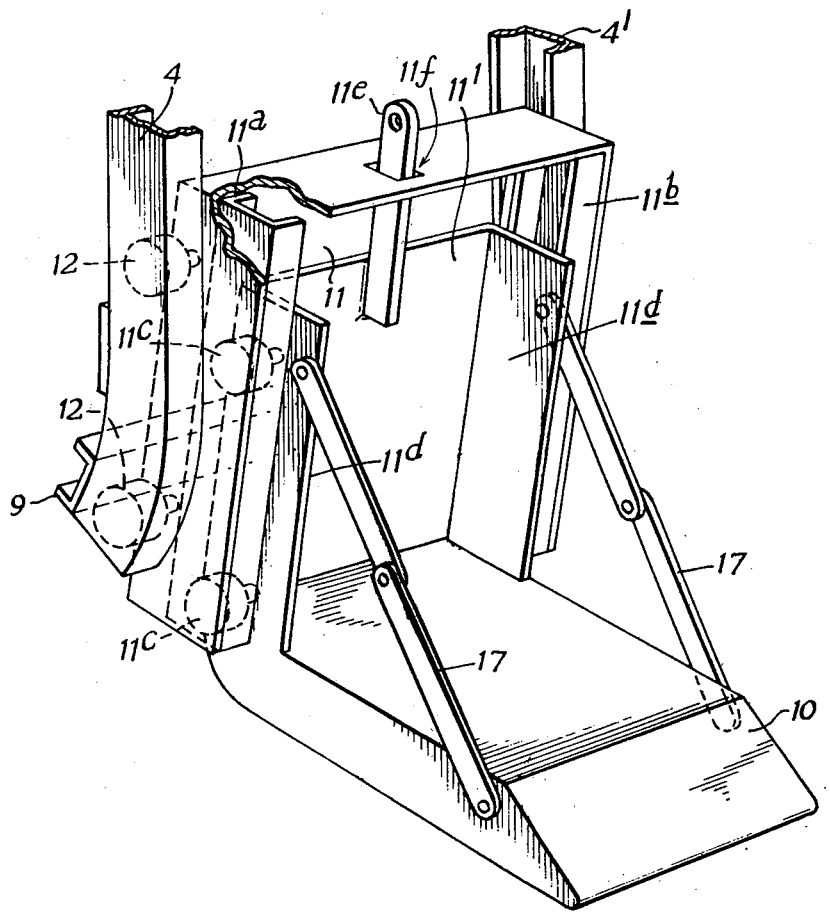
FIG. 6 is a perspective view, to a larger scale, of the trolley to show details of its construction.

The construction of the trolley is shown in detail in FIG. 6. The U-section rails 4, 4' receive the wheels 12 carried on journals on side walls of a plane plate 11 forming a first part of the trolley as a whole. On those side walls are also mounted further U-section channels 11a, 11b which receive wheels 11c carried on journals on side walls 11d of a second plane plate 11' forming a second part of the trolley. A draw-bar 11e on the plate 11' serves for attachment of the cable 13, said draw-bar passing through an aperture 11f of an end wall of the first plate 11. The plate 11' can move longitudinally with respect to the plate 11, as determined by movement of the wheels 11c within the channels 11a, 11b.

In order not to impede the vision of the driver, the rails 4, 4' can with advantage be formed of pairs of metal blades 16, between which the wheels 12 of the trolley are guided and run.

The plane 10, operating as a scoop, is hinged to the plane 11, bearing the wheels 12, so that the trolley can be closed when the lifting-apparatus is no longer being used, for which purpose two articulated arms 17, 17′ are provided at the sides of the trolley. When the lifting-apparatus is not in use the plane 10 is folded back against the plane 11, and the trolley is affixed, by known means, to the rails 4, 4′, above the cabin.

When material in small particles has to be loaded, such as earth, which could escape from both sides of the trolley, the latter is provided with two edges (not shown in the drawing) to contain the material and also with a toothed attachment (likewise not shown in the drawing) at the ends of the plane on which the material itself is collected.

I claim:

In a mechanical shovel of the kind comprising a vehicle, a guide track mounted on the vehicle and extending forwardly and downwardly in front of the vehicle to a point spaced from the ground, a carriage having roller means engaged at longitudinally spaced points with the track so as to constrain the carriage to follow a predetermined path, said carriage including a shovel plate projecting outwardly from the carriage, and means on the vehicle for driving the carriage from a lowered position at the front end to a raised position at the rear end of the track, the improvements comprising end stop means at the front lower end of the track, a first member on said carriage on which the roller means are mounted, a second member on which the shovel plate is mounted, means coupling the second member to the carriage driving means, means slidably mounting the second member to the first member in a plane parallel to the plane containing the axes of the roller means, means on said carriage for limiting the relative movement between said first and second members to a predetermined displacement, whereby when the carriage moves downwardly until the roller means of said first member abuts against the track end stop means the second member can continue in a further downward movement within said predetermined displacement, and whereby when the second member commences to move upwardly it firstly moves relatively to the second member for the predetermined displacement and thereafter carries the first member along the track.

References Cited in the file of this patent
UNITED STATES PATENTS

| | | |
|---|---|---|
| 2,008,190 | Shippee | July 16, 1935 |
| 2,468,542 | Caldwell | Apr. 26, 1949 |
| 2,652,163 | Stickney | Sept. 15, 1953 |
| 2,707,063 | Gran et al. | Apr. 26, 1955 |
| 2,712,391 | Jones | July 5, 1955 |
| 2,788,135 | Girotti | Apr. 9, 1957 |